March 20, 1928.
H. WESELOH
WEEDER
Filed Nov. 6, 1926
1,663,396
3 Sheets-Sheet 2
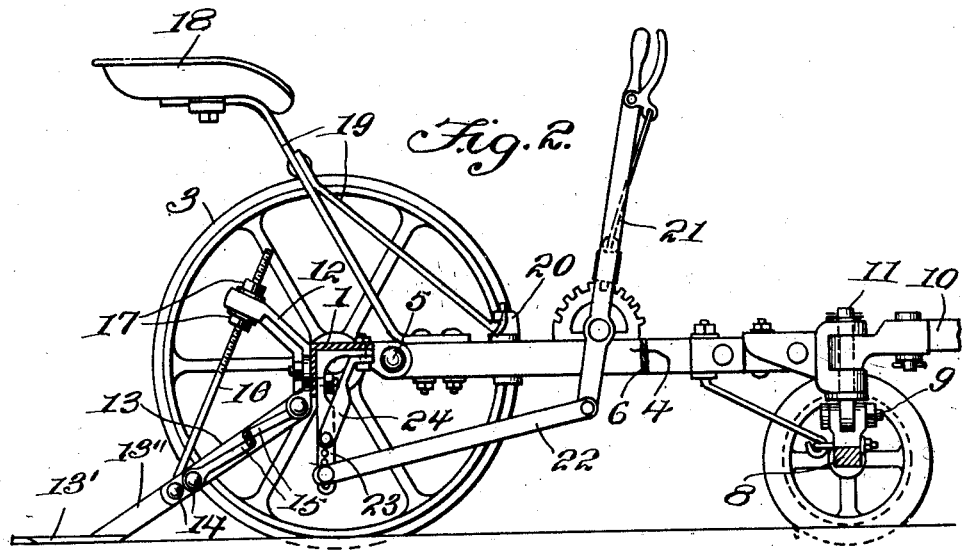
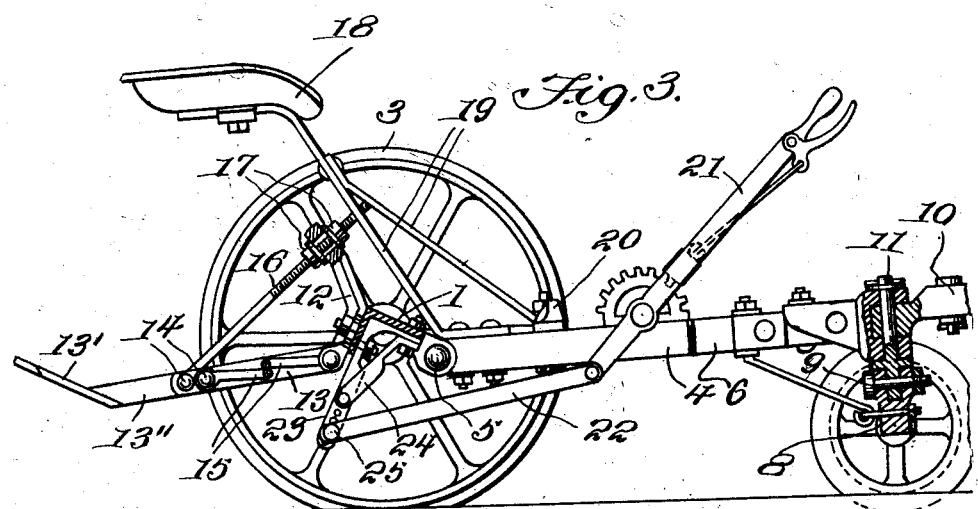
Henry Weseloh, INVENTOR
BY Victor J. Evans
ATTORNEY
WITNESS: J. T. L. Wright

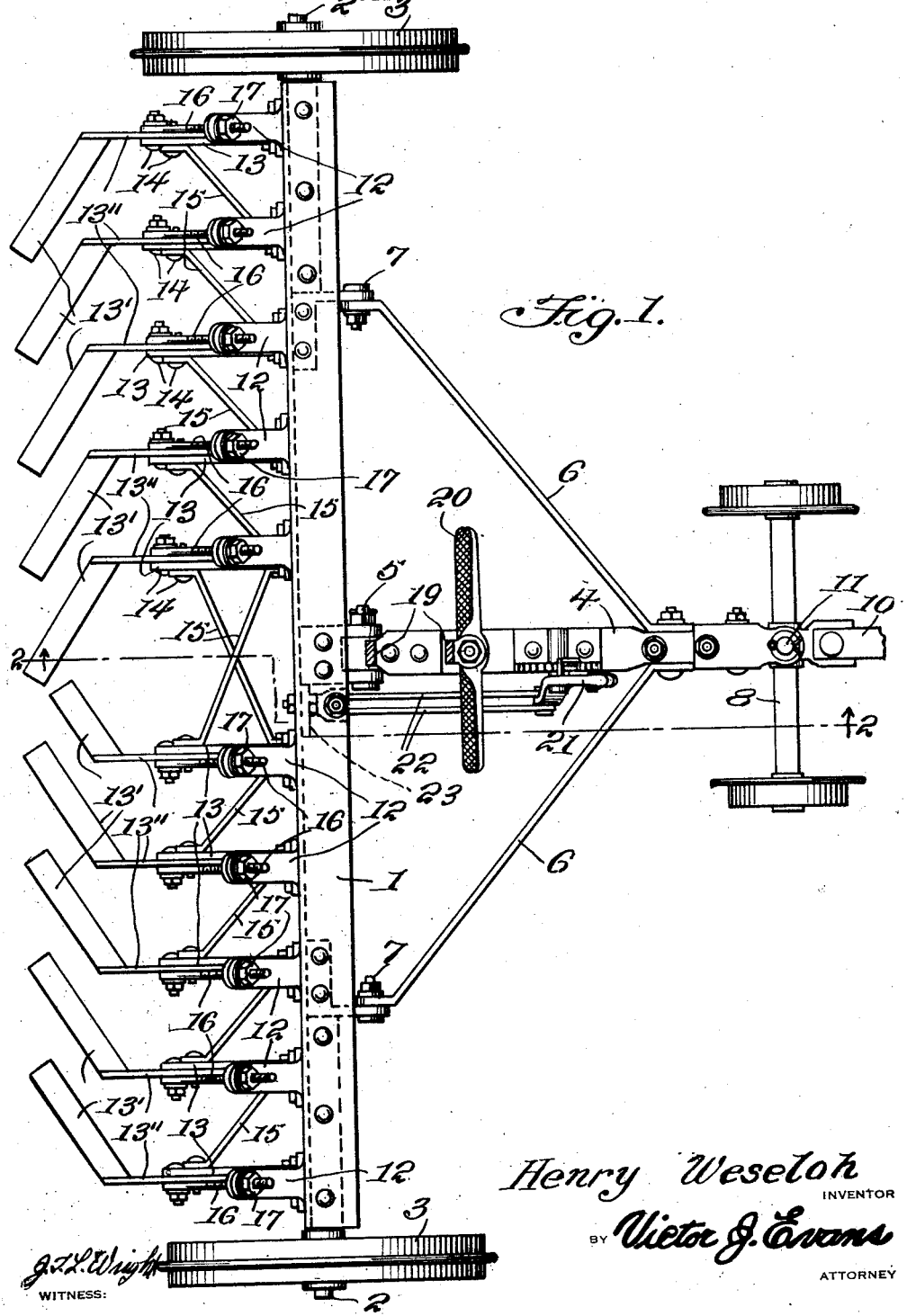

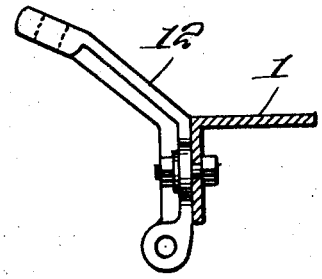
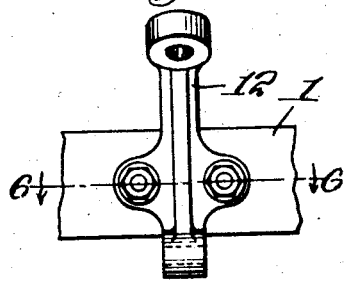
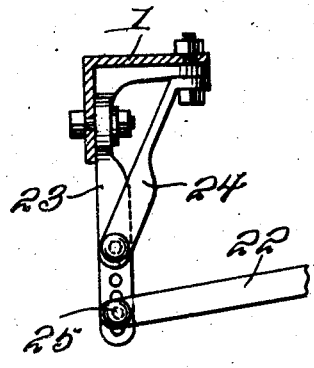
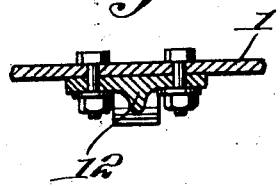
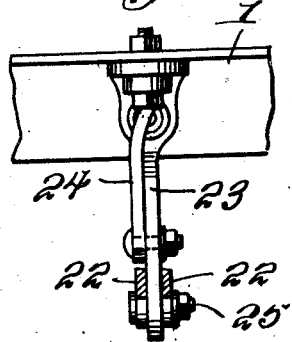

Patented Mar. 20, 1928.

1,663,396

UNITED STATES PATENT OFFICE.

HENRY WESELOH, OF LINCOLN CENTER, KANSAS.

WEEDER.

Application filed November 6, 1926. Serial No. 146,741.

This invention relates to an agricultural implement, the general object of the invention being to provide means for destroying weeds and the like in early plowed fields and in other places where weeds, voluntary wheat and other plants have grown before the field is planted.

Another object of the invention is to provide means whereby the cutting members can be raised out of engagement with the ground by the actuation of a hand lever.

A still further object of the invention is to provide means for adjusting the position of the cutting members in relation to their carrying member.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the implement.

Figure 2 is a section on line 2—2 of Figure 1.

Figure 3 is a similar view but showing the cutting members in raised position.

Figure 4 is a view of one of the brackets, with the supporting beam in section.

Figure 5 is a rear view of a portion of the supporting beam, with one of the brackets thereon.

Figure 6 is a section on line 6—6 of Figure 5.

Figure 7 is a sectional view through the supporting means and showing the means for connecting the link of the hand lever with the said beam.

Figure 8 is a front view of Figure 7.

Figure 9 is a view of one of the cutting members.

In these views, 1 indicates an angle beam which has the spindles 2 connected with the ends thereof, these spindles carrying the wheels 3. A beam 4 is pivotally connected to the center of the beam 1 by the horizontal pivot 5 and braces 6 are connected with the beam 4 and are pivotally connected with the beam 1, as shown at 7, these pivots 7 being in the same plane as the pivot 5 so that the beam 1 can rock about a horizontal axis. A truck 8 supports the front end of the beam 4 and the said truck is connected with the front end of the beam by a horizontal pivot 9 and a tongue 10 is connected with the front end of the beam 4 by the vertical pivot 11, this pivot 11 being arranged over the center of the horizontal pivot 9. This arrangement will permit the truck to ride over rough ground without placing strain on the beams and it will also permit the device to make short turns.

A plurality of brackets 12 are connected with the rear part of the beam 1 and an arm 13 has one end pivotally connected to the lower end of each bracket. A substantially L-shaped blade or cutting member 13' has its shank 13'' fastened to the lower end of each arm by means of a pair of rivets or bolts 14 and a brace 15 has one end engaging one of the bolts or rivets of each arm and its other end is fastened to the adjacent bracket 12, as clearly shown in Figure 1. A rod or brace 16 has its lower end engaging one of the bolts or rivets 14 of each arm and has its upper end screw threaded and passing through the upper end of each bracket 12 where it receives the nut 17, one nut being placed on each side of the bracket. Thus by adjusting the nuts, the position of the cutting member can be adjusted in relation to the beam.

Each cutting member has a horizontal cutting part, with the shank 13'' extending upwardly and forwardly at an angle so that when the blades or cutting members are in cutting position, their cutting edges will be parallel to the surface of the ground and they will slightly enter the ground and thus cut off all weeds and other plants in the field being cultivated. As shown in Figure 1, the blades are arranged in overlapping relation so that a part of one blade will track a part of another blade, thus insuring the entire stretch of ground, over which the device is passing, being engaged by the cutting members.

A seat 18 has its support 19 fastened to the rear end of the beam 4, said beam also carrying the foot rests 20. A hand lever 21 is pivotally supported on the beam 4 and the lower end of the said lever is connected by a link 22 with a depending part of a bracket 23 which is bolted to the beam 1 and is strengthened by the brace 24, the link being adjustably connected with the bracket, as shown at 25. Thus by manipulating the hand lever, the beam 1 can be moved from the position shown in Figure 2 to that shown in Figure 3 so as to raise the cutting members out of contact with the ground and thus permit the device to be moved without the knives engaging the ground.

From the foregoing it will be seen that this implement will cut all the weeds and other plants in a field, and by making the device of considerable length, a wide stretch of the field is treated each time the implement passes over the same so that a field can be quickly gone over by this device. As the knives enter the ground slightly, the weeds are cut off at the roots so that there is no danger of them sprouting out again and the knives can be adjusted so that they can be made to enter the ground to the desired extent. The knives can easily and quickly be moved to inoperative position when an obstruction is encountered or when the device is to be moved from one field to another.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A farm implement comprising a wheeled frame including a tiltable beam, a plurality of brackets carried thereby, an arm pivotally connected with the lower part of each bracket, a rod connected with each arm and extending through the upper end of each bracket, nuts on the rod for adjusting its position in relation to the bracket, a substantially L-shaped cutting member connected with each arm and means for tilting the beam.

2. A farm implement comprising a wheeled frame including a tiltable beam, a plurality of brackets carried thereby, an arm pivotally connected with the lower part of each bracket, a rod connected with each arm and extending through the upper end of each bracket, nuts on the rod for adjusting its position in relation to the bracket, a substantially L-shaped cutting member connected with each arm, a hand lever pivotally connected with the frame, a link connected with the lower end thereof, and a bracket connected with the tiltable beam and depending downwardly and connected with the link.

3. A farm implement of the class described comprising a beam, a spindle connected with each end thereof, a wheel on each spindle, a forwardly extending beam pivotally connected with the first mentioned beam, a truck connected with the forward end of the second beam, braces connected with the second beam and pivotally connected with the first beam, a hand lever connected with the second beam, the first beam having a depending part connected therewith, a link connecting said part with the lever so that the first beam can be tilted by manipulation of the lever, brackets on the rear of the first beam and cutting members supported by the brackets.

In testimony whereof I affix my signature.

HENRY WESELOH.